J. W. THOMPSON.
Post-Hole Diggers.

No. 149,168.

Patented March 31, 1874.

Witnesses:
P. C. Dieterich
J. Engineck

Inventor:
J. W. Thompson
Per
Attorneys.

UNITED STATES PATENT OFFICE.

JAMES W. THOMPSON, OF PORTLAND MILLS, INDIANA.

IMPROVEMENT IN POST-HOLE DIGGERS.

Specification forming part of Letters Patent No. 149,168, dated March 31, 1874; application filed July 19, 1873.

*To all whom it may concern:*

Be it known that I, JAMES W. THOMPSON, of Portland Mills, in the county of Parke and State of Indiana, have invented a new and Improved Post-Hole Digger; and I do hereby declare that the following is a full, clear, and exact description of the same, reference being had to the accompanying drawing forming a part of this specification.

The invention will first be fully described, and then pointed out in the claim.

Figure 1:
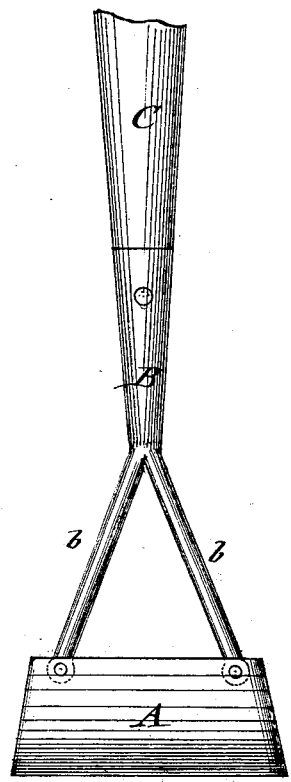
Figure 2:
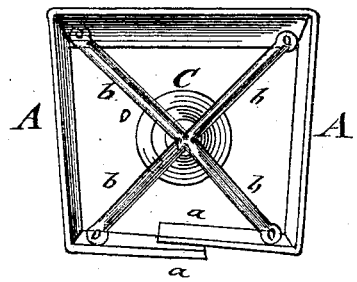

Figure 1 is a side elevation, and Fig. 2 a bottom view, of the digger.

A represents a spring-blade, flared toward the lower end; B b, a handle-socket; and C, a handle, all of which have been heretofore arranged relatively to each other, and for the same purpose.

All these diggers, it will be observed, make a smaller cut at first than afterward, the cutting-edges being spread apart as the digger goes down, and the maximum cross-sectional area of cut being at the bottom of each core taken out. This is necessary to enable the blade to clasp the earth, but produces a considerable resistance, the expanded tool being lifted through a hole made by it when less expanded. It therefore becomes necessary that the core which is to be lifted shall be cut completely on the sides and require no tearing or extra power to fracture it. This is not done in the post-hole diggers now known to the public, they having the ends of the blade or the two blades pressed farther and farther apart until the lowest portion of the cut is reached, and leaving a long slip on one side of the tool uncut, in which are often roots that bind the parts of earth together. This causes these old tools to stick, and to be raised with so much difficulty that they are thereby rendered impracticable in actual use.

To avoid this difficulty I cause the ends *a a* to overlap each other, as shown in Fig. 2 of drawing, so that they are only in line, and end to end at the bottom of cut, every particle of the sides being thoroughly excised, and the whole core coming out clean and without obstruction from the sides.

Having thus described my invention, what I claim as new, and desire to secure by Letters Patent, is—

The quadrangular blade A of a post-hole digger, having its inner edges beveled and its free ends *a a* overlapped, as and for the purpose described.

JAMES W. THOMPSON.

Witnesses:
 HENRY H. MATHIAS,
 JOHN M. BLAKE.